US 8,964,741 B2

(12) United States Patent
Retana et al.

(10) Patent No.: US 8,964,741 B2
(45) Date of Patent: Feb. 24, 2015

(54) ADJACENCY DISCOVERY THROUGH MULTICAST AND SINGLE-HOP MESSAGING

(75) Inventors: Alvaro E. Retana, Raleigh, NC (US); Thang Tat Do, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 818 days.

(21) Appl. No.: 13/164,809

(22) Filed: Jun. 21, 2011

(65) Prior Publication Data
US 2012/0327933 A1    Dec. 27, 2012

(51) Int. Cl.
H04L 12/28    (2006.01)
G06F 15/177   (2006.01)
H04L 12/751   (2013.01)

(52) U.S. Cl.
CPC ........................... H04L 45/02 (2013.01)
USPC ..................... 370/390; 370/392; 709/220

(58) Field of Classification Search
None
See application file for complete search history.

(56) References Cited

U.S. PATENT DOCUMENTS

| | | | | |
|---|---|---|---|---|
| 6,374,303 B1 * | 4/2002 | Armitage et al. | ............. | 709/242 |
| 6,683,849 B1 * | 1/2004 | Langridge et al. | ............. | 370/223 |
| 6,795,403 B1 * | 9/2004 | Gundavelli | ............. | 370/256 |
| 6,865,728 B1 * | 3/2005 | Branson et al. | ............. | 717/108 |
| 6,959,009 B2 * | 10/2005 | Asokan et al. | ............. | 370/475 |
| 6,992,985 B1 * | 1/2006 | Das | ............. | 370/252 |
| 7,035,257 B2 * | 4/2006 | Vafaei | ............. | 370/389 |
| 7,065,579 B2 * | 6/2006 | Traversat et al. | ............. | 709/230 |
| 7,275,102 B2 * | 9/2007 | Yeager et al. | ............. | 709/224 |
| 7,822,810 B2 * | 10/2010 | Dayal et al. | ............. | 709/204 |
| 7,924,761 B1 * | 4/2011 | Stevens | ............. | 370/315 |
| 7,961,690 B2 * | 6/2011 | Nagarajan et al. | ............. | 370/338 |
| 8,055,788 B1 * | 11/2011 | Chan et al. | ............. | 709/238 |
| 8,339,959 B1 * | 12/2012 | Moisand et al. | ............. | 370/235 |
| 8,495,726 B2 * | 7/2013 | Agarwal et al. | ............. | 726/13 |
| 8,533,823 B2 * | 9/2013 | Szeto et al. | ............. | 726/22 |
| 8,626,877 B2 * | 1/2014 | Greene et al. | ............. | 709/220 |
| 2001/0051981 A1 * | 12/2001 | Davison et al. | ............. | 709/203 |
| 2002/0161879 A1 * | 10/2002 | Richard | ............. | 709/223 |
| 2003/0002521 A1 * | 1/2003 | Traversat et al. | ............. | 370/465 |
| 2003/0005092 A1 * | 1/2003 | Nelson et al. | ............. | 709/220 |
| 2003/0204742 A1 * | 10/2003 | Gupta et al. | ............. | 713/200 |
| 2004/0143755 A1 * | 7/2004 | Whitaker et al. | ............. | 713/200 |
| 2005/0163061 A1 * | 7/2005 | Piercey et al. | ............. | 370/255 |
| 2005/0198224 A1 * | 9/2005 | Kobayashi et al. | ............. | 709/220 |
| 2006/0114911 A1 * | 6/2006 | Nguyen | ............. | 370/395.4 |
| 2006/0227769 A1 * | 10/2006 | Veits | ............. | 370/389 |
| 2007/0076658 A1 * | 4/2007 | Park et al. | ............. | 370/329 |

(Continued)

OTHER PUBLICATIONS

*IEEE Standard for Local and Metropolitan Area Networks*—Station and Media Access Control Connectivity Discovery; IEEE Computer Society; 203 pages, Sep. 17, 2009.

*Primary Examiner* — Marsha D Banks Harold
*Assistant Examiner* — Christopher Wyllie
(74) *Attorney, Agent, or Firm* — Baker Botts L.L.P.

(57) ABSTRACT

A first node of a network may send a multicast discovery message comprising a domain identifier of the first node. The first node may also send a single-hop discovery message to one or more single-hop neighbors of the first node. The single-hop discovery message may comprise the domain identifier of the first node. A plurality of neighbor discovery messages may be received. At least one node of the network may be identified through the neighbor discovery messages. A level of trust may be determined for each identified node of the network based on at least one of the neighbor discovery messages.

18 Claims, 3 Drawing Sheets

(56) References Cited

U.S. PATENT DOCUMENTS

| | | | |
|---|---|---|---|
| 2007/0101009 A1* | 5/2007 | Chen et al. | 709/229 |
| 2007/0206596 A1* | 9/2007 | Ishikawa et al. | 370/390 |
| 2008/0144631 A1* | 6/2008 | Park et al. | 370/395.2 |
| 2008/0159304 A1* | 7/2008 | Ozugur et al. | 370/401 |
| 2008/0247392 A1* | 10/2008 | White et al. | 370/392 |
| 2008/0313450 A1* | 12/2008 | Rosenberg | 713/2 |
| 2009/0180399 A1* | 7/2009 | Li et al. | 370/254 |
| 2009/0225654 A1* | 9/2009 | Sharp | 370/231 |
| 2010/0011048 A1* | 1/2010 | Morris | 709/201 |
| 2010/0131582 A1* | 5/2010 | Driscoll et al. | 709/202 |
| 2010/0164693 A1* | 7/2010 | Zhang et al. | 340/10.31 |
| 2010/0265846 A1* | 10/2010 | Weniger | 370/254 |
| 2011/0072508 A1* | 3/2011 | Agarwal et al. | 726/13 |
| 2011/0126265 A1* | 5/2011 | Fullerton | 726/4 |
| 2012/0327933 A1* | 12/2012 | Retana et al. | 370/390 |
| 2014/0022911 A1* | 1/2014 | Sandick et al. | 370/242 |

* cited by examiner

ADJACENCY DISCOVERY THROUGH MULTICAST AND SINGLE-HOP MESSAGING

TECHNICAL FIELD

The present disclosure relates generally to communications networking and more specifically to adjacency discovery through multicast and single-hop messaging.

BACKGROUND

When a node joins a network it may perform a discovery process through which it discovers its neighbors and advertises its presence to other nodes of the network. Once a node has discovered its neighbors, it may determine various rules for sending traffic to and receiving traffic from its discovered neighbors. The process of discovering neighbors and determining traffic processing rules may be called adjacency discovery.

BRIEF DESCRIPTION OF THE DRAWINGS

For a more complete understanding of the present disclosure and its features and advantages, reference is now made to the following description, taken in conjunction with the accompanying drawings, in which.

DESCRIPTION OF EXAMPLE EMBODIMENTS

Overview

According to one embodiment, a node of a network may send a multicast discovery message to a plurality of other nodes of the network. The multicast discovery message may comprise a domain identifier of the first node. The node may also send a single-hop discovery message to one or more single-hop neighbors of the first node. Each single-hop neighbor may be separated from the first node by a single-hop. The single-hop discovery message may comprise the domain identifier of the node. A plurality of neighbor discovery messages may be received. The neighbor discovery messages may comprise one or more neighbor single-hop discovery messages from the one or more single-hop neighbors and one or more neighbor multicast discovery messages. At least one node of the network may be identified through the neighbor discovery messages. A level of trust may be determined for each identified node of the network based on at least one of the neighbor discovery messages.

Certain embodiments of the disclosure may provide one or more technical advantages. A technical advantage of one embodiment may be that a node may determine a level of trust for other nodes of a network based on messages it receives from those nodes. Another technical advantage of one embodiment may be that a node may form adjacencies that are commensurate with the trustworthiness of its neighbor nodes.

Certain embodiments of the disclosure may include none, some, or all of the above technical advantages. One or more other technical advantages may be readily apparent to one skilled in the art from the figures, descriptions, and claims included herein.

Description

Figure 1A:
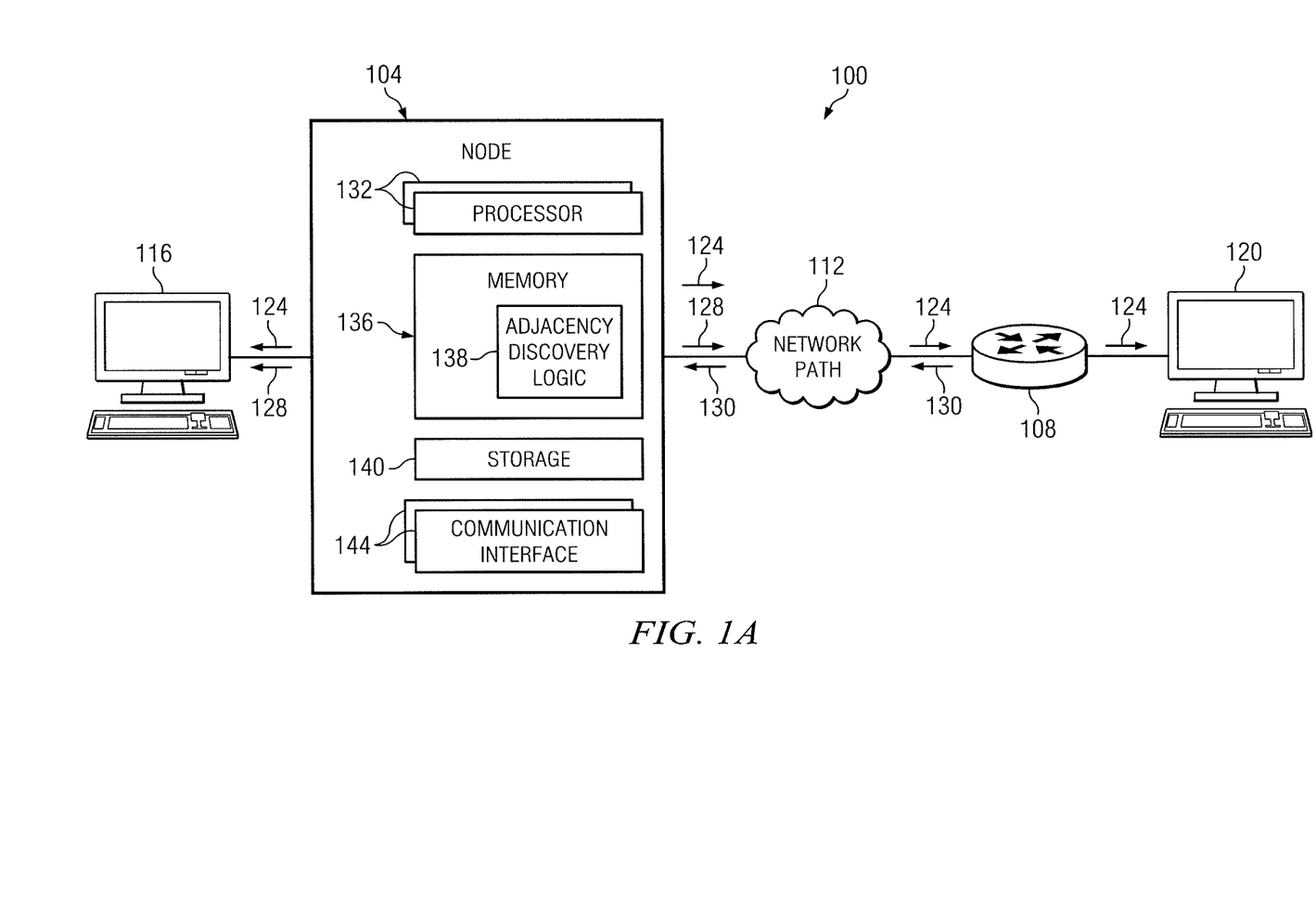
FIG. 1A depicts an example network that comprises nodes that perform adjacency discovery through multicast and single-hop messaging.

FIG. 1 depicts an example network 100 that comprises nodes that perform adjacency discovery through multicast and single-hop messaging. Network 100 includes various network nodes 104, 108, 116, and 120, and network path 112 coupled as shown. Network path 112 may comprise one or more additional nodes and/or connections. A network may be two or more nodes coupled together such that the nodes may communicate with each other. A network node may be any suitable device operable to receive traffic from and send traffic to other nodes of a network. For example, a network node may comprise a router, switch, hub, computer, or other suitable communication device. As used herein, a network node may be synonymous with neighbor, neighbor node, and node.

When a node joins a network, it generally performs a process called adjacency discovery. During adjacency discovery, the node may send one or more messages advertising the nodes presence to other nodes of the network. The node may also receive one or more messages from the other nodes. Through these messages, the node may identify one or more other nodes of the network. After identifying the other nodes, the node may send traffic to and receive traffic from the other nodes. This process may also allow the other nodes of the network to identify the new node.

Nodes may utilize various methods to perform adjacency discovery. For example, a node may utilize a multicast protocol to send a multicast message and conduct adjacency discovery based on responses to this message and/or multicast messages received from other nodes of the network. Multicast protocols generally operate at Level 3 of the Open Systems Interconnection (OSI) model. Examples of multicast protocols include Internet Protocol version 6 Neighbor Discovery, Bonjour, Service Advertisement Framework, and Universal Plug and Play. A multicast message may be a message that is broadcast by a node to each other node of a network. For example, a node may send a multicast message to its single-hop neighbors (described below), and each of these neighbors may send the multicast message to each of its single-hop neighbors, and so on until the multicast message has been sent to each node of the network that is operable to receive a multicast message.

Using a multicast message to discover the other nodes of a network may allow identification of other nodes of the network, but only if they respond to the multicast message or send their own multicast messages. However, a node may not be operable to respond to a particular multicast message or send its own multicast message or may choose not to respond to the particular multicast message. For example, a rogue router coupled to a multi-access interface (e.g., a switch) may not respond to a multicast message or send its own multicast message and thus the discovering node may not be able to identify the rogue router (and may not even have knowledge of its existence). Accordingly, if the node identifies other trustworthy nodes coupled to the switch, the node may mistakenly believe that all of the nodes coupled to the switch are trustworthy. Furthermore, in certain situations, the information provided in the responses to a multicast message (or by the multicast messages from other nodes) may not be adequate for the node to optimize adjacency formations with the other nodes of the network.

As another example of an adjacency discovery method, a node may utilize a single-hop protocol to send a single-hop message to its single-hop neighbors. Single-hop protocols generally operate at Level 2 of the OSI model. Examples of single-hop protocols include Cisco Discovery Protocol and Link Layer Discovery Protocol-Media Endpoint Discovery. A single-hop neighbor of a node may be coupled to the node through a link that does not include any intervening nodes. For example, nodes 104 and 116 are single-hop neighbors of each other. Thus, a message from a node may be sent to a single-hop neighbor without passing through another node. In some embodiments, a single-hop message may be configured to travel only a single-hop, that is, once the single-hop neighbor has received the single-hop message, it is not forwarded to another node.

Using single-hop messaging to discover other nodes of a network may allow discovery of specific connectivity of various nodes of the network. However, an adjacency discovery process based only on single-hop messaging may not be deployable if a switch or other network node does not support adjacency discovery through single-hop messaging. For example, a node may not be operable to (or may choose not to) send or process single-hop messages that advertise or seek discovery information.

In some embodiments, a node 104 sends a multicast discovery message 124 to one or more other nodes (such as nodes 108, 116, and 120) of the network 100. The multicast discovery message 124 is propagated to every node of the network operable to receive multicast messages. The node 104 also sends a single-hop discovery message 128 to one or more single-hop nodes (such as node 116). The node 104 identifies other nodes of the network through one or more neighbor discovery messages (such as message 130) received from neighbor nodes. Node 104 classifies the identified nodes based upon the neighbor discovery messages 130 it receives. For example, node 104 establishes a level of trust for each neighboring node 108, 116, and 120. After classifying one or more of its neighboring nodes, node 104 decides whether to form an adjacency with one or more of the identified nodes. An adjacency specifies how a node processes traffic with respect to the node it has an adjacency with. Node 104 may also determine what type of adjacency to form with one or more of the identified nodes. The determinations of whether to form an adjacency and what type of adjacency to form with a neighbor may also be based on one or more of the neighbor discovery messages 130 received by the discovering node 104.

Some embodiments avoid various drawbacks associated with using either a multicast protocol or a single-hop protocol to form adjacencies with other nodes. For example, some embodiments may allow detection of unauthorized nodes, such as rogue routers. As another example, some embodiments may enable a node to form adjacencies with other nodes that are commensurate with the trustworthiness of the respective nodes.

As depicted in FIG. 1, network 100 includes various network nodes 104, 108, 116, and 120. A network node, such as node 104, may include one or more portions of one or more computer systems. In particular embodiments, one or more of these computer systems may perform one or more steps of one or more methods described or illustrated herein. In particular embodiments, one or more computer systems may provide functionality described or illustrated herein. In some embodiments, encoded software running on one or more computer systems may perform one or more steps of one or more methods described or illustrated herein and/or provide functionality described or illustrated herein.

The components of the one or more computer systems may comprise any suitable physical form, configuration, number, type, and/or layout. As an example, and not by way of limitation, one or more computer systems may comprise an embedded computer system, a system-on-chip (SOC), a single-board computer system (SBC) (such as, for example, a computer-on-module (COM) or a system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, one or more computer systems may be unitary or distributed, span multiple locations, span multiple machines, or reside in a cloud, which may include one or more cloud components in one or more networks.

In particular embodiments, a computer system may include a processor, memory, storage, one or more communication interfaces, and a display. As an example, node 104 comprises a computer system that includes one or more processors 132, memory 136, storage 140, and one or more communication interfaces 144. These components may work together in order to provide functionality described herein.

Processor 132 may be a microprocessor, controller, or any other suitable computing device, resource, or combination of hardware, stored software and/or encoded logic operable to provide, either alone or in conjunction with other components of node 104, node functionality. In some embodiments, node 104 may utilize multiple processors to perform the functions described herein.

Memory 136 and/or storage 140 may comprise any form of volatile or non-volatile memory including, without limitation, magnetic media (e.g., one or more tape drives), optical media, random access memory (RAM), read-only memory (ROM), flash memory, removable media, or any other suitable local or remote memory component or components. Memory 136 and/or storage 140 may store any suitable data or information utilized by node 104, including software embedded in a computer readable medium, and/or encoded logic incorporated in hardware or otherwise stored (e.g., firmware). Memory 136 and/or storage 140 may also store the results and/or intermediate results of the various calculations and determinations performed by processor 132.

Communication interface 144 may be used for the communication of signaling and/or data between node 104 and one or more networks and/or components (such as nodes) coupled to a network. For example, communication interface 144 may be used to send multicast and single-hop discovery messages and receive neighbor discovery messages. Communication interface 144 may also be operable to send traffic to and receive traffic from other nodes of network 100. Each communication interface 144 may send and receive data and/or signals according to a distinct standard such as Asynchronous Transfer Mode (ATM), Frame Relay, or Gigabit Ethernet (or other IEEE 802.3 standard). In the embodiment depicted, node 104 has a communication interface to computer 116 that is distinct from its communication interface to network path 112.

In some embodiments, node 104 may undergo an adjacency discovery process in which it sends discovery messages (such as multicast discovery messages, single-hop discovery messages, or responses to multicast discovery messages or single-hop discovery messages) to other nodes of the network, receives neighbor discovery messages, identifies nodes, classifies the identified nodes, and/or forms adjacencies with these nodes.

Figure 1B:
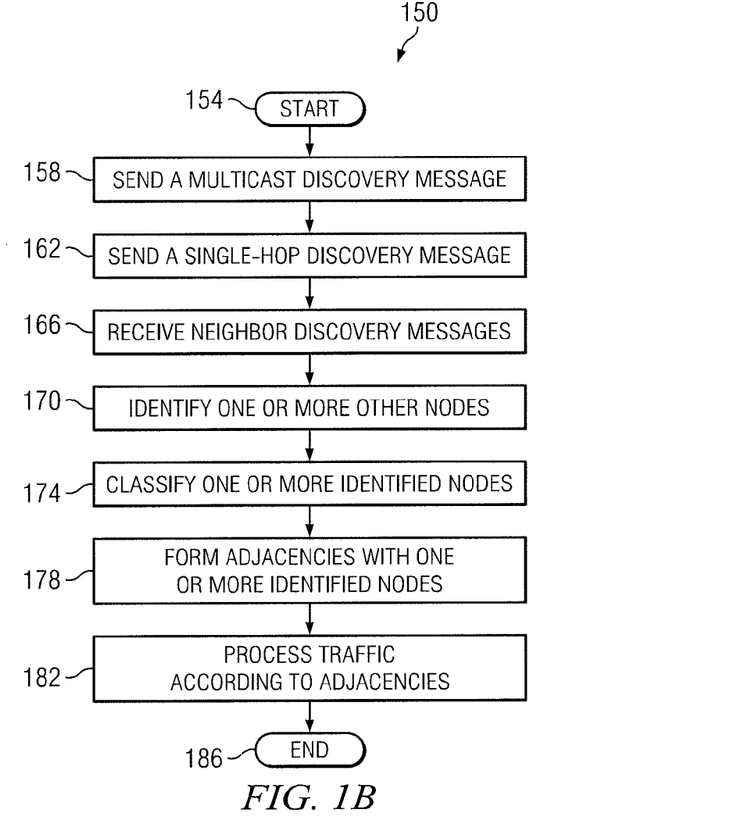
FIG. 1B depicts an example method that may performed by one or more nodes of the network of FIG. 1A.

FIG. 1B depicts an example method 150 of adjacency discovery that may performed by one or more nodes 104 of network 100. The steps of method 150 are described with regards to the elements of FIG. 1A. In some embodiments, various steps depicted in FIG. 1B may be performed by executing adjacency discovery code 138 by one or more processors 132 of FIG. 1A.

The method begins at step 154. At step 158, a node 104 sends a multicast discovery message 124. The multicast discovery message 124 may be propagated to each node of network 100. For example, a single-hop neighbor (such as node 116 of the node 104 may receive the multicast discovery message and send it to its single-hop neighbors. These single-hop neighbors may repeat this process until each node of the network (that is operable to receive a multicast message) has received the multicast discovery message. Thus, multicast discovery message 124 is received at computer 116, one or more nodes within network path 112, router 108, and computer 120.

In some embodiments, a multicast discovery message 124 (or a single-hop discovery message 128 or a neighbor discovery message 130) may include a domain identifier (e.g., "D") and/or node identifier (e.g., "rtr1") of node 104. The domain identifier may be any suitable indication of a domain of the node, such as a numeric, alphabetical, alphanumeric, or other suitable identifier. The domain may be a logical and/or physical partition of a group of nodes. For example, a domain may be created to facilitate trustworthy communication among nodes of a network that are also members of the domain. Thus, in some embodiments, two nodes that have equivalent domain identifiers are in the same domain and may trust each other. In some embodiments, each node of a network may also be a member of a common domain. In other embodiments, two or more nodes of the same network may not be members of a common domain (e.g., a rogue router may not be in the same domain as other nodes of the network). The node identifier identifies the sender of the discovery message. In certain embodiments, a discovery message may also include a type of the node (described below).

At step 162, the node 104 sends a single-hop discovery message 128 to its single-hop neighbors. Single-hop discovery message 128 may be sent to computer 116 and to another node within network path 112 that is one hop away from node 104 (or to node 108 if the network path 112 does not include any intervening nodes). Single-hop discovery message 128 may comprise the domain identifier (e.g., "D") and the node identifier (e.g., "rtr1") of node 104. One or more messages that include the single-hop discovery messages 128 may be specifically addressed to the single-hop neighbors, such that they do not propagate to nodes other than the single-hop neighbors.

A node 104 may send a discovery message (i.e., multicast discovery message or single-hop discovery message) at any appropriate time. For example, the node may send one or more discovery messages (such as 124 or 128) upon joining a network 100. As another example, node 104 may send one or more discovery messages upon an indication that another node has joined to or dropped from network 100. As a further example, node 104 may periodically send discovery messages to other nodes 108, 116, and 120 of the network 100.

At step 166, the node may receive one or more neighbor discovery messages 130 from neighbor nodes (such as node 108) of the network. Neighbor discovery message 130 may be a neighbor multicast discovery message or a neighbor single-hop discovery message. A neighbor multicast discovery message is received from a neighbor (such as node 108) by a discovering node and may be a multicast discovery message sent by the neighbor or a response to the discovering node's (e.g., node 104) multicast discovery message (which response may be sent in any suitable manner, such as multicast, unicast, or other method). A neighbor single-hop discovery message may be received from a single-hop neighbor 116 by a discovering node 104 and may be a single-hop discovery message sent by the neighbor or a response to the discovering node's single-hop discovery message (which response also may be sent in any suitable manner).

A neighbor discovery message 130 may include a domain identifier of the node (such as node 108) sending the neighbor discovery message. As an example, router 108 may send neighbor discovery message 130 that includes a domain identifier "D" of node 108. Some neighbor discovery messages 130 may not include a domain identifier or may include a domain identifier that is different from the domain identifier of the node 108 that sent the multicast discovery message. Some nodes may not respond to the multicast discovery message.

Node 104 may receive one or more neighbor discovery messages from its single-hop neighbor(s) and/or other neighbors. In some embodiments node 104 receives a neighbor multicast discovery message and a neighbor single-hop discovery message from the same neighbor. In some embodiments, a node does not receive a neighbor discovery message 130 from one or more of its neighbors (e.g., the neighbor may be incapable of sending a neighbor discovery message or may choose not to send a neighbor discovery message). In some embodiments, a neighbor discovery message may not include a domain identifier of the sending node, or may include a domain identifier that is different from the receiving node's domain identifier.

At step 170, node 104 identifies one or more neighbor nodes (such as node 108) based on the received neighbor discovery messages 130. Identifying a node may include discovering an identity of the node. For example, neighbor discovery message 130 may include a node identifier (e.g., "rtr2") that may be used by node 104 to identify node 108. A node 104 may also identify a single-hop neighbor 116 even if it does not receive a neighbor discovery message 130 from the single-hop neighbor. In such a case, the node 104 may assign the single-hop neighbor an identity.

At step 174, node 104 classifies the identified nodes based on the neighbor discovery messages it received (or did not receive). Thus, node 104 will classify one or more neighbor nodes (such as nodes 108 and 116) according to the neighbor discovery messages it received (or did not receive). Classification may include determining a level of trust of a node. For example, classification may involve determining through a node's received neighbor discovery messages whether another node is a member of the same domain. In some embodiments, node 104 examines a domain identifier of a neighbor discovery message 130 received from a neighbor node 108 to determine whether neighbor node 108 is of the same domain as node 104.

Node 104 may classify one or more other nodes of the network 100 as "trusted," "unicast," or "untrusted." Specific examples of trust classifications are described in relation to FIGS. 2A-2C and a general overview is given below.

A neighbor node is classified as "trusted" if the neighbor node responds to the multicast discovery message 124 or single-hop discovery message 128 with a neighbor discovery message 130 (or send its own multicast discovery message) that includes a domain identifier that is equivalent to the receiving node 104's domain identifier (i.e., the neighbor node is of the same domain as the discovering node), and 1) the neighbor node also sends a neighbor single-hop discovery message 128 with the same domain identifier, or 2) the discovering node identifies only one single-hop neighbor of type "verified" (explained further below).

A neighbor node may be classified as "unicast" if the neighbor node sends the discovering node 104 a multicast neighbor discovery message that includes a domain identifier that is equivalent to the discovering node's domain identifier (i.e., the neighbor node is of the same domain as the discovering node), but neither of the other two conditions for classification as "trusted" is met (as described above).

A neighbor node may be classified as "untrusted" if it cannot be determined through a neighbor discovery message that the neighbor node is of the same domain as the discovering node 104. For example, a node that sends a multicast neighbor discovery message with a domain identifier that is different from the domain identifier of the discovering node may be classified as an untrusted node. Similarly, if a neighbor node sends a neighbor multicast discovery message that does not specify a domain identifier, the neighbor node may be classified as untrusted. In addition, if a discovering node 104 senses a single-hop neighbor, but does not receive a single-hop neighbor discovery message from the single-hop neighbor that includes the same domain identifier as the discovering node's domain identifier, it may classify this neighbor as "untrusted."

In some embodiments, one or more communication interfaces 144 of a node may also be classified. For example, if only untrusted neighbors are discovered on a communication interface, or no neighbors on that communication interface send a neighbor discovery message to the discovering node 104, the whole communication interface may be marked as untrusted.

As described above, a node may have a type attribute. In some embodiments, one or more nodes may each determine a type for itself. In certain embodiments, a node is of type "transparent" or "verified." A node may label itself as "transparent" if the node does not receive any single-hop discovery messages or if another "transparent" node is discovered on at least one of its communication interfaces 144. In some embodiments, a node may be "transparent" as to a particular interface, if the node does not receive any single-hop discovery messages through that communication interface or if another "transparent" node is discovered on that communication interface 144. A node may label itself as "verified" if all of its neighbors on all of its communication interfaces have a classification of "trusted" and none are of type "transparent." In some embodiments, a node may label itself as "verified" as to a particular communication interface, if all of its neighbors on that interface are of type "trusted" and none are of type "transparent." Specific examples of type determination are described below in relation to FIGS. 2A-2C.

In some embodiments, node 104 may advertise its type to one or more of its neighbor nodes. For example, a node's type may be advertised in a discovery message sent by the node to one or more of its neighbors. In some embodiments, a node 104 may change its type during operation. For example, a "verified" node may suddenly be coupled to an untrusted node and change its own type to "transparent." When a node's type changes, the node 104 may notify one or more of its neighbors of the type change. Thus, a type change may propagate throughout the network and may result in type changes of various nodes. For example, if a node changes to "transparent," each node that it is coupled to may change to "transparent" (if that node is of type "trusted"). In some embodiments, each node operable to determine its type has a default type of "transparent." That is, the node will default to type "transparent" upon being powered on.

At step 178, node 104 may form adjacencies with one or more of the identified nodes (such as node 108). As an example, node 104 may form a unicast adjacency or a multicast adjacency with node 108. Node 104 may base the decision of whether to form an adjacency (and what type of adjacency to form) with a neighbor node on information included in its received neighbor discovery messages. For example, node 104 may base these decisions on the domain identifiers and/or node types specified in the neighbor discovery messages.

In some embodiments, if a neighbor node is untrusted, then no adjacency is formed between node 104 and the neighbor node. Point-to-point adjacencies are formed by the node 104 with the unicast and trusted nodes on a communication interface of node 104 if one or more unicast or untrusted nodes are on that interface. If only trusted nodes are on a communication interface, a multicast adjacency may be formed by node 104 with each node on the interface.

At step 182, node 104 may process traffic according to the adjacencies formed (or not formed) with neighboring nodes. As an example, all traffic that is addressed to (i.e., the traffic's destination is) a node that is not of the same domain as the receiving node may be forwarded, even if the traffic is from a node with which the receiving node has not formed an adjacency with. For example, if nodes 116 and 120 are labeled as untrusted by node 104, node 104 will still forward traffic from node 116 to node 120. However, if traffic from a node that the receiving node 104 has not formed an adjacency with is addressed to a node of the same domain as the receiving node, the receiving node may drop the traffic. For example, control plane traffic may be addressed to various nodes of the domain. Thus, if a receiving node 104 of a domain receives control plane traffic for that domain (i.e., a node within that domain) from a node 116 with which it has no adjacency, it may drop the control plane traffic.

In contrast, if a node has formed a point-to-point or multicast adjacency with another node, it may allow traffic from that node that is addressed to a node of the domain to be delivered. For example, node 104 may forward (or process) control plane traffic from node 108 if that traffic is addressed to a node of the same domain (or itself). Specific examples of adjacency formation are described below in relation to FIGS. 2A-2C.

In some embodiments, a node may send or forward traffic through the network according to the adjacencies formed with the other nodes. In some embodiments, if a node has formed a point-to-point adjacency with another node, then the node may send or forward traffic to the other node through one or more unicast (i.e., point-to-point) messages, but may not send multicast messages to that node. In some embodiments, if a node has formed a multicast adjacency with another node, then it may send or forward traffic to that node through one or more multicast messages (or unicast messages).

In some embodiments, multiple nodes of a network may perform one or more steps of method 150. In some embodiments, one or more steps of the method may be performed by a node when the node joins a network, senses that a neighbor has been added or dropped from an existing network, and/or at regular intervals.

In some embodiments, a node may perform one or more steps of FIG. 1B independently on each communication interface 144. For example, node 104 may send out a multicast discovery message 124 that is delivered to each node coupled to the node through a specific communication interface 144 of the node (i.e., each node on that interface). Node 104 may also send out a distinct multicast discovery message on a separate communication interface 144. Similarly, node 104 may send out a single-hop discovery message 128 to each single-hop node on a particular communication interface 144 and a distinct single-hop discovery message to each single-hop node on a separate communication interface. In some embodiments, the methods described herein for identifying other nodes, forming adjacencies with identified nodes, and processing traffic according to the adjacencies may all be applied on a per-interface basis.

In other embodiments, a node may perform one or more steps of FIG. 1B without regard to the various communication interfaces of a node. For example, node 104 may send out a multicast discovery message 124 that is delivered to each node coupled to the node 104 through any communication interface 144 of the node. Similarly, node 104 may send out a single-hop discovery message to each single-hop node on any communication interface 144 of the node. In some embodiments, the methods described herein for identifying other nodes, forming adjacencies with identified nodes, and processing traffic according to the adjacencies may all be applied without regards to the specific communication interface a neighbor node is reachable through.

Figure 2A:
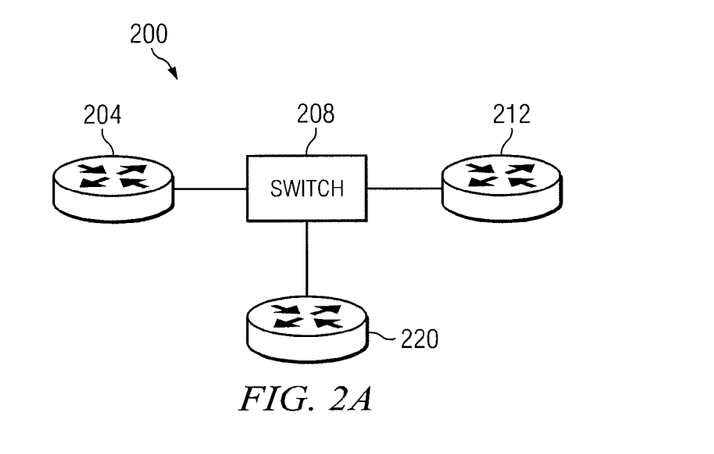
FIGS. 2A-2C depict example configurations of a network that comprises nodes that perform adjacency discovery through multicast and single-hop messaging.
Figure 2B:
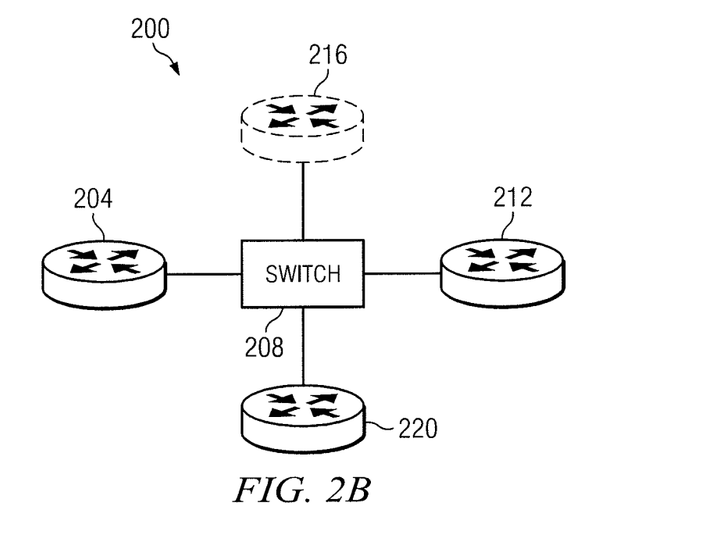
Figure 2C:
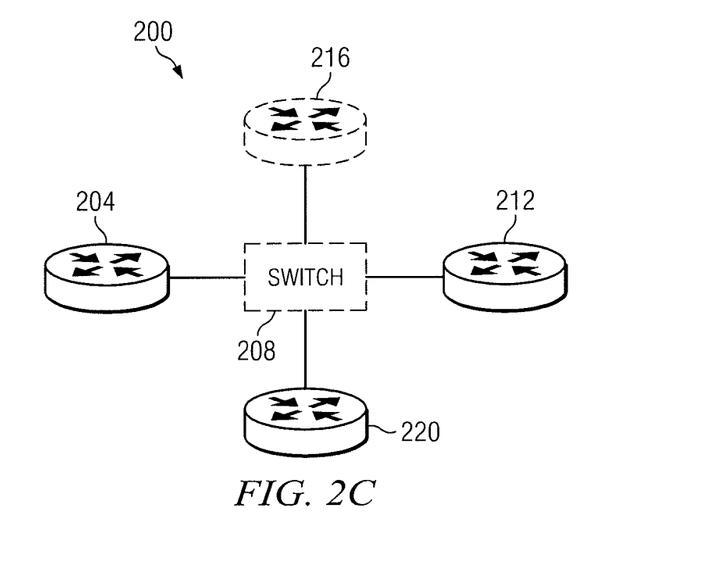

FIGS. 2A-2C depict example configurations of a network 200 that may include nodes that perform adjacency discovery through multicast and single-hop messaging. Network 200 includes network nodes 204, 208, 212, 216, and 220. Network nodes 204, 212, and 220 are routers that all comprise the same domain identifier. Node 208 is a network switch. Node 216 is a rogue router that does not send neighbor discovery messages. Nodes 204, 208, 212, and 220 may be example implementations of node 104 of FIG. 1A.

One or more nodes of network 200 may perform adjacency formation by sending a multicast discovery message and a single-hop discovery message. In FIG. 2A, switch 208 comprises the same domain identifier as nodes 204, 212, and 220 and is operable to send and process discovery messages. Node 208 may send a single-hop discovery message to nodes 204, 212, and 220 and a multicast discovery message to nodes 204, 212, and 220. Node 208 may receive two neighbor discovery messages (a single-hop neighbor discovery message and a multicast neighbor discovery message) from node 204. Because both messages comprise a domain identifier that is equivalent to the domain identifier of node 208, node 208 determines that node 204 is trusted. In a similar manner, node 208 may determine that nodes 212 and 220 are trusted based on their respective neighbor discovery messages. Because all of the neighbors on the multi-access communication interface of node 208 are trusted, node 208 sets its type to "verified," and notifies nodes 204, 212, and 220 of such.

Node 204 may send a multicast discovery message to nodes 208, 212, and 220, and a single-hop discovery message to node 208. Based on the neighbor discovery messages it receives, node 204 determines that each other node is trusted and that node 204's type is verified. For example, even though nodes 212 and 220 may only send a multicast discovery message, node 204 determines they are trusted because node 204 only has one single-hop neighbor (node 208) on its communication interface and that the single-hop neighbor is verified. Nodes 212 and 220 may send similar discovery messages and may each determine that all their neighbors are trusted and that the types of nodes 212 and 220 are verified. Because only trusted nodes exist on the respective communication interfaces of each node, each node may form multicast adjacencies with every other node.

In the embodiment depicted in FIG. 2B, rogue router 216 is coupled to switch 208. Thus, switch 208 would sense that node 216 is a single-hop neighbor and would send rogue router 216 a multicast discovery message and a single-hop discovery message. Rogue router 216 may not send a neighbor discovery message to switch 208 or may send a neighbor discovery message with a domain identifier that is not equivalent to switch 208's domain identifier. Accordingly, switch 208 will classify rogue router as untrusted, and will set the type of switch 208 to "transparent." An indication of the type of switch 208 may be sent to routers 204, 212, and 220 and they may set their respective types to "transparent." Each of routers 204, 212, and 220 will classify switch 208 as trusted. However, even though routers 204, 212, and 220 each have the same domain identifier, they will classify each other as unicast because each node did not identify one single-hop "verified" neighbor. Thus, because at least one unicast node is on the respective communication interface of each of routers 204, 212, and 220, each router will form point-to-point adjacencies with switch 208 and the other routers (except no adjacencies are formed with rogue router 216).

In the embodiment depicted in FIG. 2C, switch 208 is not operable to send and process discovery messages. For example, switch 208 may not be operable to send multicast and single-hop discovery messages or process neighbor discovery messages. In this scenario, routers 204, 212, and 220 will each classify switch 208 as untrusted, since they will not be able to verify that switch 208 is of the same domain. Each router (excluding rogue router 216) will verify through their received neighbor discovery messages that the other routers (again excluding rogue router 216) are of the same domain and thus will classify each other router as unicast since the additional criteria for being a trusted node is not met). However, because at least one untrusted node exists on the respective communication interfaces of the routers, each router (except rogue router 216) will form point-to-point adjacencies with the other routers and none of the routers will form an adjacency with switch 208. These classifications and adjacencies do not change if rogue router 216 is also coupled to switch 208.

Modifications, additions, or omissions may be made to the systems, apparatuses, and methods disclosed herein without departing from the scope of the invention. The components of the systems may be integrated or separated. Moreover, the operations of the systems may be performed by more, fewer, or other components. Additionally, operations of the systems may be performed using any suitable logic comprising software, hardware, and/or other logic. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
sending, by a first node of a network, a multicast discovery message to a plurality of nodes of the network, the multicast discovery message comprising a domain identifier of the first node, the multicast discovery message operable to be propagated to each node of the network that is reachable through a communication interface of the first node;
sending, by the first node, a single-hop discovery message to one or more single-hop neighbors of the first node, each single-hop neighbor separated from the first node by a single-hop, the single-hop discovery message comprising the domain identifier of the first node, the single-hop discovery message configured to travel a single hop;

receiving a plurality of neighbor discovery messages, the neighbor discovery messages comprising:
one or more neighbor single-hop discovery messages from the one or more single-hop neighbors; and
one or more neighbor multicast discovery messages;
identifying at least one node of the network through the neighbor discovery messages;
determining a level of trust for each identified node of the network based on one or more of the neighbor discovery messages, including determining that an interface of the first node is fully trusted, comprising determining that each of the at least one discovery messages includes the same domain identifier as the domain identifier of the first node and determining that each of the one or more single hop neighbors of the first node has sent a neighbor single-hop discovery message to the first node, or the first node identifies only one single-hop neighbor node having a verified type, the verified type indicating that all neighbors of a node are classified as trusted and none have a transparent type, the transparent type indicating that a node has not received any single-hop discovery messages or that another transparent node is discovered by that node; and
forming a multicast adjacency with each node of the network that is reachable through the interface.

2. The method of claim 1, wherein the determining a level of trust for each identified node of the network is further based on one or more domain identifiers included in the neighbor discovery messages.

3. The method of claim 1, further comprising:
forming an adjacency with an identified node of the network, the adjacency based on at least one of the neighbor discovery messages.

4. The method of claim 1, further comprising:
determining, based on at least one of the neighbor discovery messages, that an interface of the first node is partially trusted; and
forming a unicast adjacency with each node of the network that is reachable through the interface and sends the first node a domain identifier that is the same as the domain identifier of the first node.

5. The method of claim 1, further comprising:
determining, based on at least one of the neighbor discovery messages, that an interface of the first node is untrusted; and
determining that no adjacencies should be formed with the identified nodes of the network that are reachable through that interface.

6. The method of claim 1, further comprising:
determining that a second node of the network is an untrusted node; and
dropping traffic from the second node that is addressed to a node of the network that has the same domain identifier as the first node.

7. A first node of a network comprising:
a memory configured to store computer executable instructions; and
one or more processors coupled to the memoir, the processors configured, when executing the instructions, to:
send a multicast discovery message to a plurality of nodes of the network, the multicast discovery message comprising a domain identifier of the first node, the multicast discovery message operable to be propagated to each node of the network that is reachable through a communication interface of the first node;
send a single-hop discovery message to one or more single-hop neighbors of the first node, each single-hop neighbor separated from the first node by a single-hop, the single-hop discovery message comprising the domain identifier of the first node, the single-hop discovery message configured to travel a single hop;
receive a plurality of neighbor discovery messages, the neighbor discovery messages comprising:
one or more neighbor single-hop discovery messages from the one or more single-hop neighbors; and
one or more neighbor multicast discovery messages;
identify at least one node of the network through the neighbor discovery messages;
determine a level of trust for each identified node of the network based on at least one of the neighbor discovery messages and further operable to determine that an interface of the first node is fully trusted, by performing operations comprising determining that each of the at least one discovery messages includes the same domain identifier as the domain identifier of the first node and determining that each of the one or more single hop neighbors of the first node has sent a neighbor single-hop discovery message to the first node, or the first node identifies only one single-hop neighbor node having a verified type, the verified type indicating that all neighbors of a node are classified as trusted and none have a transparent type, the transparent type indicating that a node has not received any single-hop discovery messages or that another transparent node is discovered by that node; and
form a multicast adjacency with each node of the network that is reachable through the interface.

8. The first node of claim 7, wherein the determining a level of trust for each identified node of the network is further based on one or more domain identifiers included in the neighbor discovery messages.

9. The first node of claim 7, the one or more processors further configured, when executing the instructions, to:
form an adjacency with an identified node of the network, the adjacency based on at least one of the neighbor discovery messages.

10. The first node of claim 7, the one or more processors further configured, when executing the instructions, to:
determine, based on at least one of the neighbor discovery messages, that an interface of the first node is partially trusted; and
form a unicast adjacency with each node of the network that is reachable through the interface and sends the first node a domain identifier that is the same as the domain identifier of the first node.

11. The first node of claim 7, the one or more processors further configured, when executing the instructions, to:
determine, based on at least one of the neighbor discovery messages, that an interface of the first node is untrusted; and
determine that no adjacencies should be formed with the identified nodes of the network that are reachable through that interface.

12. The first node of claim 7, the one or more processors further configured, when executing the instructions, to:
determine that a second node of the network is an untrusted node; and
drop traffic from the second node that is addressed to a node of the network that has the same domain identifier as the first node.

13. A non-transitory computer-readable medium having computer-executable code, when executed by a computer operable to:

send a multicast discovery message to a plurality of nodes of the network, the multicast discovery message comprising a domain identifier of a first node, the multicast discovery message operable to be propagated to each node of the network that is reachable through a communication interface of the first node;

send a single-hop discovery message to one or more single-hop neighbors of the first node, each single-hop neighbor separated from the first node by a single-hop, the single-hop discovery message comprising the domain identifier of the first node, the single-hop discovery message configured to travel a single hop;

receive a plurality of neighbor discovery messages, the neighbor discovery messages comprising:
  one or more neighbor single-hop discovery messages from the one or more single-hop neighbors; and
  one or more neighbor multicast discovery messages;

identify at least one node of the network through the neighbor discovery messages;

determine a level of trust for each identified node of the network based on at least one of the neighbor discovery messages and further operable to determine that an interface of the first node is fully trusted, by performing operations comprising determining that each of the at least one discovery, messages includes the same domain identifier as the domain identifier of the first node and determining that each of the one or more single hop neighbors of the first node has sent a neighbor single-hop discovery message to the first node, or the first node identifies only one single-hop neighbor node having a verified type, the verified type indicating that all neighbors of a node are classified as trusted and none have a transparent type, the transparent type indicating that a node has not received any single-hop discovery messages or that another transparent node is discovered by that node; and form a multicast adjacency with each node of the network that is reachable through the interface.

14. The medium of claim 13, wherein the determining a level of trust for each identified node of the network is further based on one or more domain identifiers included in the neighbor discovery messages.

15. The medium of claim 13, the medium further operable to:
  form an adjacency with an identified node of the network, the adjacency based on at least one of the neighbor discovery messages.

16. The medium of claim 13, the medium further operable to:
  determine, based on at least one of the neighbor discovery messages, that an interface of the first node is partially trusted; and
  form a unicast adjacency with each node of the network that is reachable through the interface and sends the first node a domain identifier that is the same as the domain identifier of the first node.

17. The medium of claim 13, the medium further operable to:
  determine, based on at least one of the neighbor discovery messages, that an interface of the first node is untrusted; and
  determine that no adjacencies should be formed with the identified nodes of the network that are reachable through that interface.

18. The medium of claim 13, the medium further operable to:
  determine that a second node of the network is an untrusted node; and
  drop traffic from the second node that is addressed to a node of the network that has the same domain identifier as the first node.

* * * * *